(12) United States Patent
Sasaoka

(10) Patent No.: US 6,696,641 B2
(45) Date of Patent: *Feb. 24, 2004

(54) TERMINAL BOX AND SOLAR CELL MODULE

(75) Inventor: Makoto Sasaoka, Kyotanabe (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,087

(22) Filed: May 19, 1998

(65) Prior Publication Data

US 2001/0001424 A1 May 24, 2001

(30) Foreign Application Priority Data

May 28, 1997 (JP) .............................. 9-138031

(51) Int. Cl.[7] .............................................. H02G 3/14
(52) U.S. Cl. .............................. 174/50; 174/58; 174/60; 220/3.8; 220/4.02
(58) Field of Search ....................... 174/50, 58, 48, 174/60, 63, 17 CT; 220/3.2, 3.8, 4.02, 3.3

(56) References Cited

U.S. PATENT DOCUMENTS

| | | | | |
|---|---|---|---|---|
| 1,999,194 A | * | 4/1935 | Hubbell, Jr. ................. | 174/58 |
| 3,617,611 A | * | 11/1971 | Kuether ....................... | 174/51 |
| RE28,489 E | * | 7/1975 | Schindler ................. | 220/3.2 X |
| 4,390,114 A | * | 6/1983 | Sviatoslavsky et al. ...... | 220/3.7 |
| 5,228,924 A | * | 7/1993 | Barker et al. ............... | 136/246 |
| 5,593,532 A | * | 1/1997 | Falk et al. ................... | 156/285 |
| 5,864,091 A | * | 1/1999 | Sumida ....................... | 174/50 |
| 6,051,787 A | * | 4/2000 | Rintz ........................... | 174/66 |
| 6,207,896 B1 | * | 3/2001 | Toyomura ................... | 174/58 |

* cited by examiner

*Primary Examiner*—Dhiru R Patel
(74) *Attorney, Agent, or Firm*—Fitzpatrick, Cella, Harper & Scinto

(57) ABSTRACT

A terminal box is provided for covering an exposed electrode portion of a photovoltaic element. A part or all of each side of the terminal box includes an inclined surface.

16 Claims, 12 Drawing Sheets

TERMINAL BOX AND SOLAR CELL MODULE

BACKGROUND OF THE INVENTION

1. Field of the Invention

The present invention relates to the structure of an exposed terminal portion of a solar cell module and more particularly to the technology for improvement in moldability, strength, and reliability after installation, of a terminal box attached to the solar cell module.

2. Related Background Art

In general, in solar cell modules, terminal boxes are normally bonded to portions thereof intended for output extraction in the back surface of a solar cell module with an adhesive such as silicone resin or epoxy resin and the positive and negative output lines are guided out of terminal boxes. Each external output line is mechanically connected or is integral with a lead wire, which is taken out from an exposed electrode portion of the solar cell, inside the terminal box.

The terminal boxes normally have such configurations as a cube, a rectangular parallelepiped, or a cylinder, as shown in FIG. 12, or as combinations thereof, and all of their side surfaces comprises a surface normal to the bonded surface.

The conventional terminal boxes do not include a terminal box having all of its side surfaces each comprising an inclined surface, as described above.

However, the terminal boxes are provided so as to protrude from the solar cell module and tend to suffer an external force during transportation, during installation, or the like. In many cases, the terminal boxes suffer the external force when the protruding portions of modules, i.e., the terminal boxes, collide with each other.

Usually the bonding strength in the shearing direction of the terminal box to the solar cell module is not less than 4 kgf, which is enough to prevent the terminal box from being changed in external appearance and in performance on the occasion of ordinary contact or collision. However, it is not inconceivable that an unexpected accident or the like would cause a terminal box to suffer the external force over the designed value and to be dismounted, thereby necessitating repair or replacement of the solar cell.

On the other hand, designing the bonding strength in the shear direction of the terminal box to the solar cell module in expectation of such cases is normally excessive.

SUMMARY OF THE INVENTION

An object of the present invention is to provide a structure of an exposed terminal portion of a solar cell module that has high strength and enhanced reliability after installation, overcoming the above drawback.

The inventor has extensively and intensively studied in order to achieve the above object and finally found that employing a configuration with a part or all of each of the side surfaces of the terminal box comprising an inclined surface makes it possible to improve the strength and reliability after installation without a need for the design of excessive bonding strength in the shearing direction, thus accomplishing the present invention.

More specifically, the terminal box of the present invention is a terminal box for covering an exposed electrode portion of a photovoltaic element module, wherein a part or all of each of the side surfaces of the terminal box comprises an inclined surface.

According to the present invention, by providing an inclined surface at a part or all of each of portions that relatively tends to suffer an external force, of each of all the side surfaces of the terminal box, ascending from the bottom to the top, the effect of relieving the external force in the horizontal direction during application of the external force in the horizontal direction is enhanced.

FIG. 13 is a view showing the relation between the terminal box and the external force exerted thereon and FIG. 15 is a graph showing a presence or absence of an external force relief effect and coefficients of friction $\mu$ between an inclined surface of a terminal box and an external material.

As shown in FIG. 13, when a coefficient of friction between a material of the inclined surface portion of the terminal box and the external material is defined as $\mu$, the external force in the horizontal direction (referred to as "horizontal, external force" in the figure) as F, and an angle of inclination of the inclined surface as $\theta$, the external force in the horizontal direction can be relieved if the relation of relief force (N): $F \cos \theta >$ frictional force (M): $\mu \times F \sin \theta$ is satisfied.

Namely, as shown in FIG. 15, by setting the angle of inclination $\theta$ of the inclined surface and the coefficient of friction $\mu$ so as to be in the area of relief force (N)>frictional force (M), the effect of relieving an external force in the horizontal direction when applied with the external force in the horizontal direction is enhanced.

However, the external material cannot be specifically limited. Even if specifically limited, the coefficients of friction thereof to the inclined surface vary depending upon the shape of surface, pressure of surface, humidity, and so on. Therefore, the angle of inclination $\theta$ is preferably set small, and more preferably, it is desirable that the angle of inclination $\theta$ is set to be not more than 60°.

DESCRIPTION OF THE PREFERRED EMBODIMENTS

Figure 1:
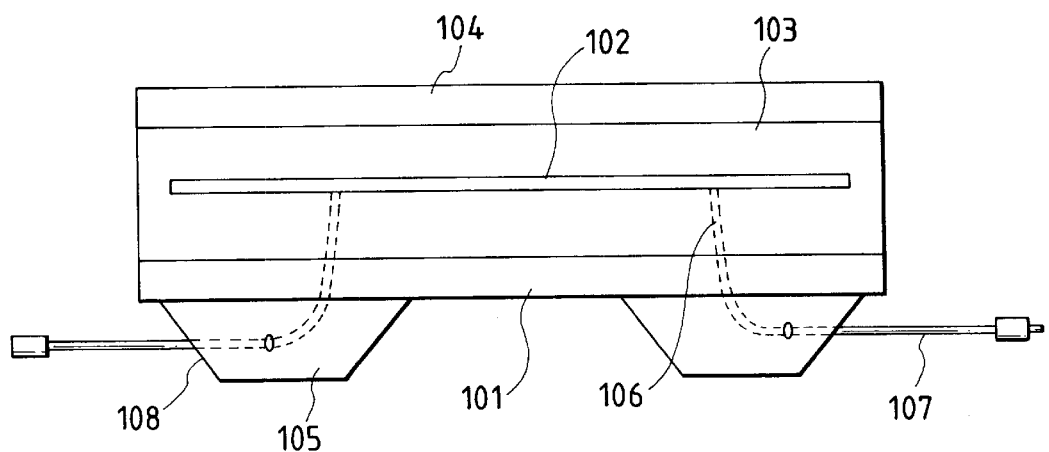
FIG. 1 is a schematic view of a solar cell module.

FIG. 1 is a schematic, structural view of an example of the solar cell module according to the present invention. Specifically, FIG. 1 is a cross-sectional view of the solar cell module. This solar cell module is constituted so as to have a solar cell element 102, a filler 103, a weather-resistant film 104, and terminal boxes 105 on a back surface of reinforcing material 101. Inside each terminal box 105 an external lead wire 107 is electrically connected with an internal lead wire 106 connected to an output terminal of the solar cell element 102. Instead of using the internal lead wire 106, the external lead wire 107 may be directly connected to the solar cell element 102.

Although the internal lead wire used in the present invention is not specifically limited, the internal lead wire needs to be selected from those having suitable heat resistance, cold resistance, oil resistance, weather resistance, and flame resistance to the environment where the solar cell modules are installed. For example, the internal lead wire is selected from insulated wires of IV, KIV, HKIV, crosslinked polyethylene, fluororubber, silicone rubber, fluororesin, or the like and cables such as VV, CV, CE, EE, or cabtyre cables.

Although the external lead wire used in the present invention is not specifically limited, the external lead wire is desirably of the cable structure.

As the external lead wire, there can be used those wires which satisfy the heat resistance, cold resistance, mechanical strength, electrical insulation, water resistance, oil resistance, wear resistance, acid resistance, and alkali resistance required depending upon the operating environment.

Specifically, the external lead wire can be selected from JIS C3605 spec 600V polyethylene cables (EV, EE, CV, CE), JIS C3621 spec 600V EP rubber-insulated cables (PN·PV), JIS C3342 spec 600V vinyl-insulated vinyl sheath (flat type) cables (VVR, VVF), JIS C3327 spec type 1, type 2, type 3, or type 4 rubber-insulated rubber cabtyre cables (1CT, 2CT, 3CT, 4CT), JIS C3327 spec type 2, type 3, or type 4 rubber-insulated chloroprene cabtyre cables (2RNCT, 3RNCT, 4RNCT), JIS C3327 spec type 2, type 3, or type 4 EP-rubber-insulated chloroprene cabtyre cables (2PNCT, 3PNCT, 4PNCT), or JIS C3312 spec vinyl-insulated vinyl cabtyre cables.

As an internal lead wire to be connected with the output terminal of the solar cell element, a material having a low electrical resistance such as a copper tab or the like can also be used.

Figure 7:
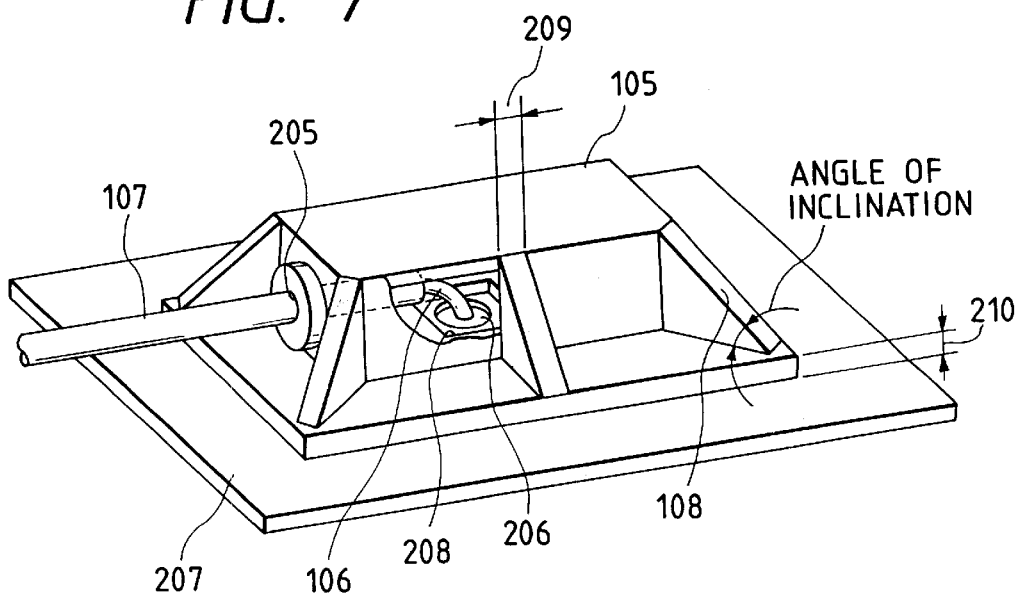
FIG. 7 is a schematic view (perspective diagram) of a terminal box of a first embodiment.

FIG. 7 is a view showing a first embodiment of the present invention. In the figure, the terminal box 105 is obtained by injection molding of a resin and the bottom surface thereof has an internal-lead-wire inlet hole 208 for taking the internal lead wire 106 into the terminal box. One side surface of the terminal box has an external-lead-wire outlet hole 205 for taking the external lead wire 107 out of the inside of the terminal box 105. The internal lead wire 106 and the external lead wire 107 are electrically connected with each other inside the terminal box 105. Numeral 207 designates a part of a solar cell module and numeral 206 designate a terminal exposing portion of the solar cell module.

At a part of each of all the side surfaces of the terminal box 105 is provided an inclined surface 108 of a flat surface in a rib shape, which ascends from the bottom surface to the top surface of the terminal box. As the shape of the rib, defining the thickness 209 of the rib to be 0.5 to 0.7 times the thickness 210 of the bottom surface prevents sink marks or the like from occurring and improves moldability, which is thus preferable. According to the present embodiment, since the inclined surfaces 108 are of the rib shape, their reinforcing effect increases the rigidity and load bearing properties and their warpage preventing effect improves the moldability.

The angle of inclination θ (degrees) of the inclined surfaces 108 is preferably not more than 60° and more preferably in the range of 10° to 60°. Angles over 60° make it hard to achieve the effects of the present invention and are thus not preferred. If the inclined surface is a curved or spherical surface, the angle of inclination will be expressed by an average inclination angle.

A structure such that the inclination angle θ (degrees) of the inclined surface 108 satisfies θ<$\text{Tan}^{-1}(1/\mu)$ can easily relieve the external force in the horizontal direction and is thus preferred. On this occasion, the value of the friction coefficient $\mu$ is determined taking account of materials that would possibly contact the terminal box. It is necessary at least to take into account contact between the terminal boxes (for example, during transportation of modules).

The terminal box of the present invention should be one excellent in heat resistance, water resistance, electrical insulation, and aging resistance. Further, the terminal box is preferably of a material having good adhesion to the filler.

When the above factors are taken into consideration, although the material for the terminal box is not specifically limited, plastics are preferred. When fire properties are taken into account, the material for the terminal box is more preferably selected from flame-retardant plastics, substantially flame-retardant plastics, ceramics, and so on.

For example, as the plastics, there may be included engineering plastics excellent in strength, impact resistance, heat resistance, hardness, and aging resistance, such as polycarbonate, polyamide, polyacetal, modified PPE, polyester, polyarylate, unsaturated polyester, phenol resin, or epoxy resin. Further, thermoplastic resins such as ABS resin, PP, PVC, or the like may be used.

Moreover, in order to enhance ultraviolet resistance, it is preferable to use carbon black as a pigment or to coat the surface thereof with a resin paint that absorbs the ultraviolet light.

Figure 14:
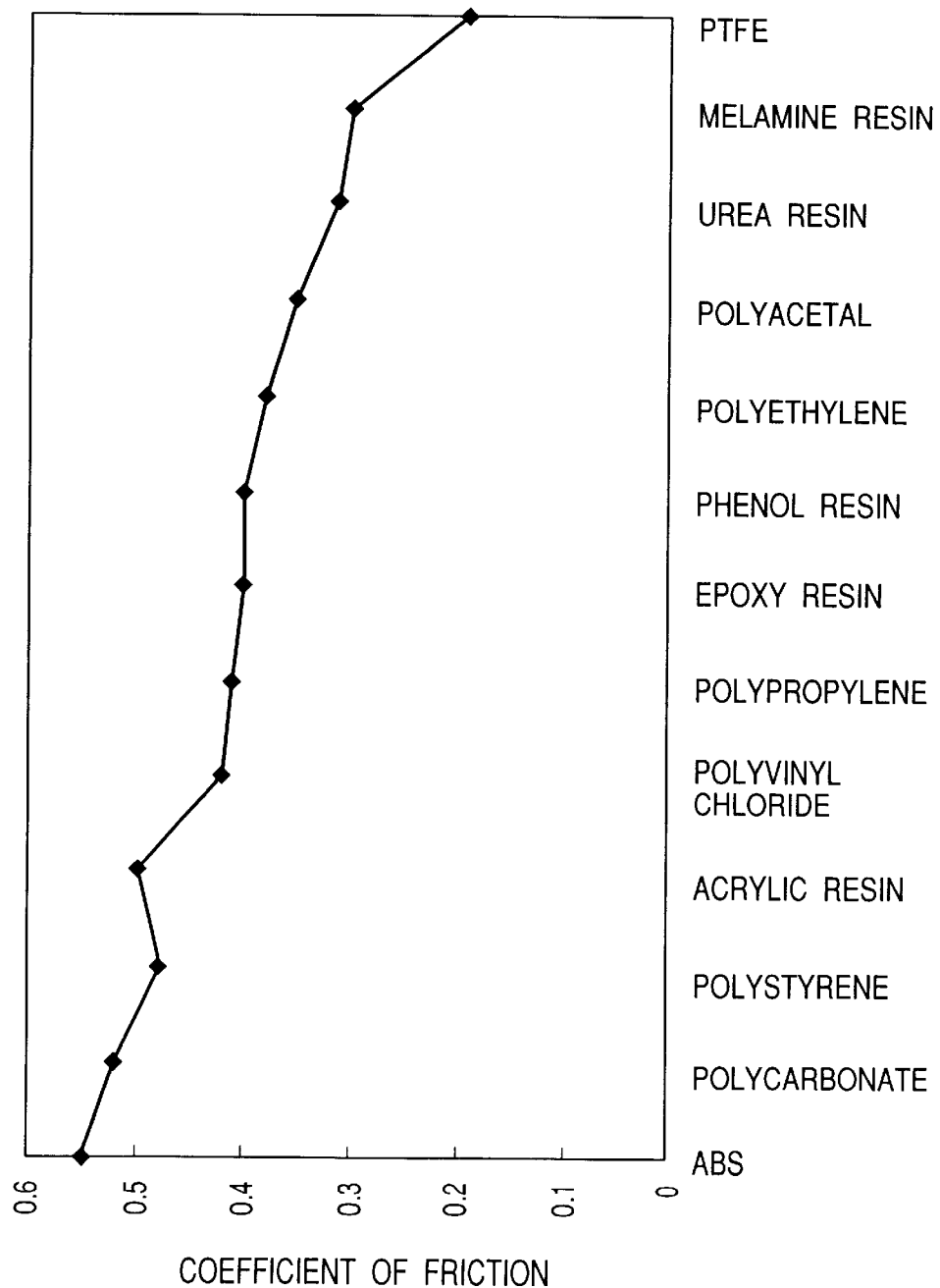
FIG. 14 is a graph showing coefficients of friction of general resin materials.
Figure 15:
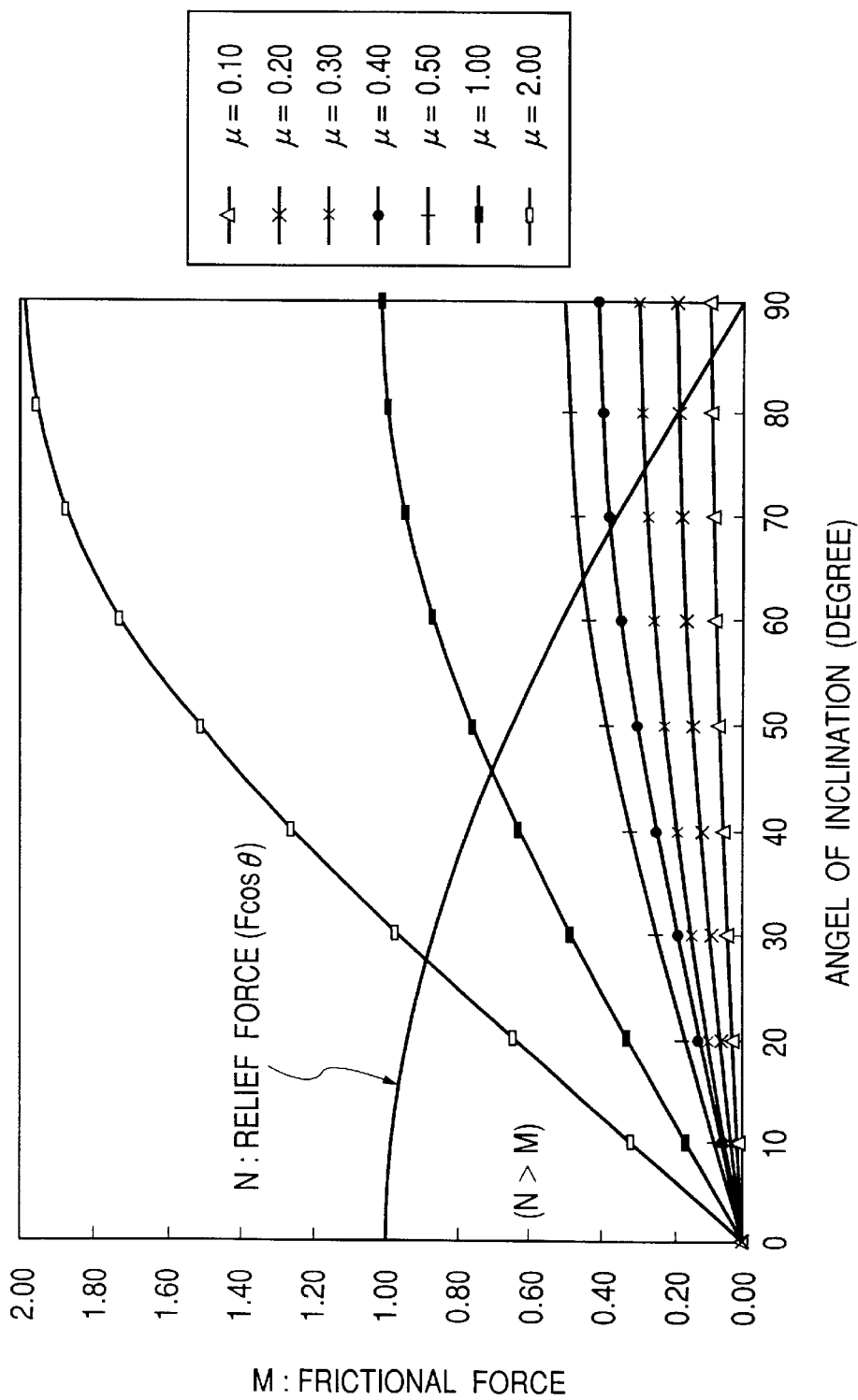
FIG. 15 is a graph showing a presence or absence of the external force relief effect and coefficients of friction $\mu$ between an inclined surface of a terminal box and an external material.

FIG. 14 shows coefficients of friction of general resin materials, and it is preferred to use at least as the material for the inclined surface 108 a resin having the friction coefficient $\mu$ not more than 0.6. Further, using a resin having a low friction coefficient $\mu$, such as PPS (polyphenylene sulfide), POM (polyoxymethylene or polyacetal), UF (urea-formaldehyde resin or urea resin), MF (melamine-formaldehyde resin or melamine resin), or PTFE (polytetrafluoroethylene) can attain such a structure that even when the average inclination angle of the inclined surface 108 is large, the external force in the horizontal direction can easily be relieved and is thus preferred.

Figure 16:
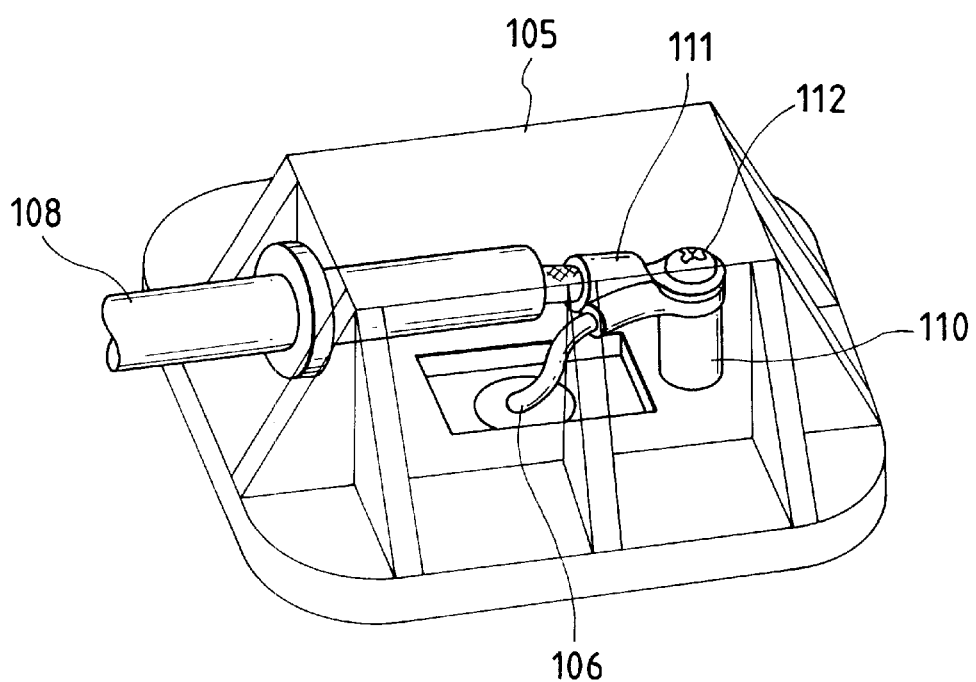
FIG. 16 is a perspective diagram showing an example of a terminal box having a terminal base.

As the terminal box, there are various types of terminal boxes, including hollow or solid terminal boxes, those with or without the filler, those with or without a lid or the like, those with or without bushing or the like in the hole portions, and those with or without a terminal base. FIG. 16 shows an example of a terminal box 105 having a terminal base 110 inside. Each of an internal lead wire 106 and external lead wire 108 has a terminal 111 and the terminals 111 are fixed to a common terminal base 110 by screw 112. This structure prevents an external force from being transmitted from the external lead wire 108 to the internal lead wire 106.

Figure 8:
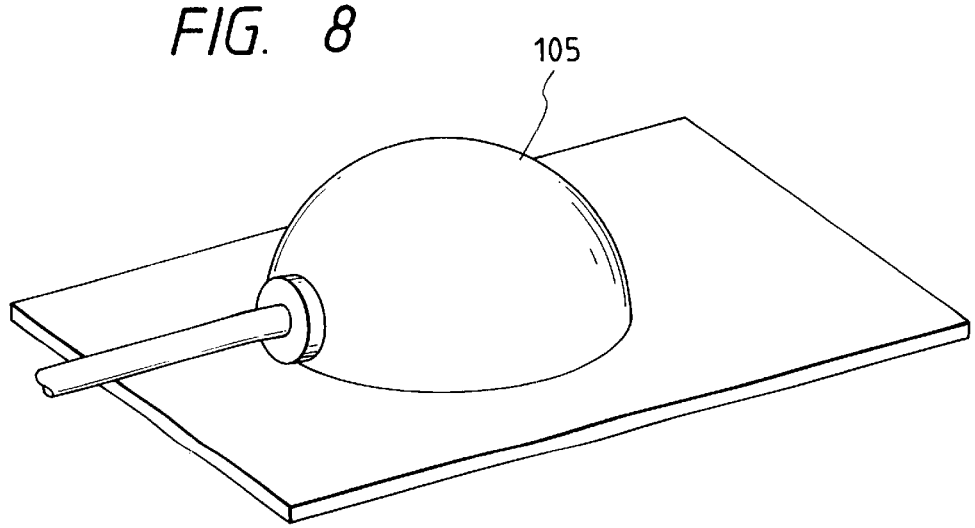
FIG. 8 is a schematic view of a terminal box of a second embodiment.

FIG. 8 is a view showing a second embodiment of the present invention. The terminal box 105 of the second embodiment is a hemisphere, in which the entire side surface is formed of an inclined surface 108 of a spherical surface ascending from the bottom surface toward the top surface. According to the present embodiment, a large draft angle can be ensured sufficiently throughout the circumference of the terminal box 105, so that the moldability is enhanced remarkably. Further, the rigidity and load bearing properties become maximized because of the hemispherical structure.

Figure 9:
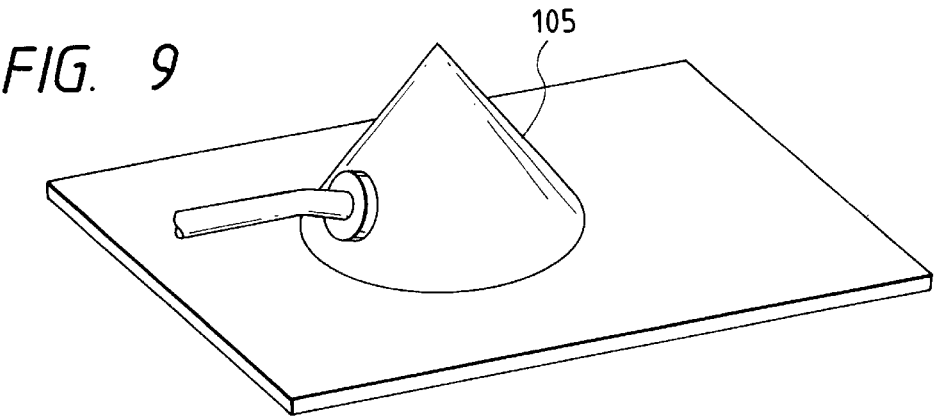
FIG. 9 is a schematic view of a terminal box of a third embodiment.

FIG. 9 is a view showing a third embodiment of the present invention. The terminal box 105 of the third embodiment is of a circular cone, in which the entire side surface is formed of an inclined surface 108 of a curved surface ascending from the bottom surface toward the top surface. According to the present embodiment, a large draft angle can be ensured sufficiently throughout the circumference of the terminal box 105, so that the moldability is enhanced remarkably.

Figure 10:
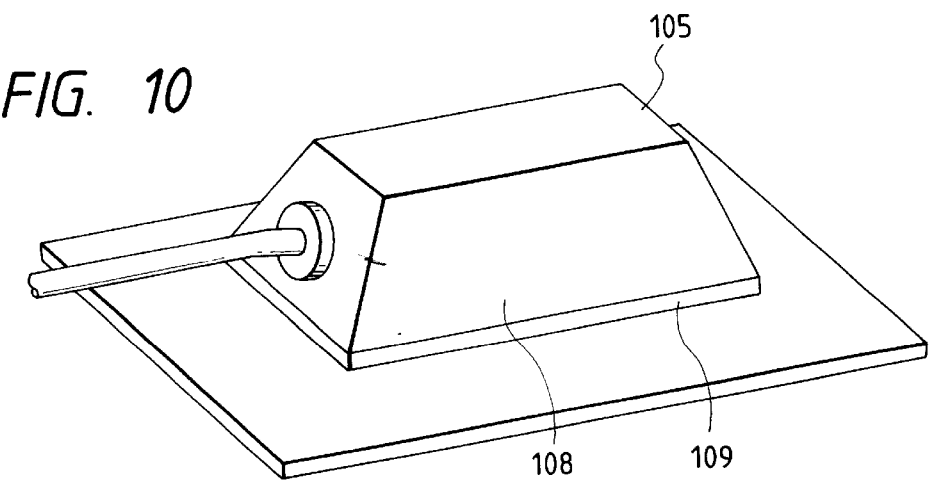
FIG. 10 is a schematic view of a terminal box of a fourth embodiment.

FIG. 10 is a view showing a fourth embodiment of the present invention. The terminal box 105 of the fourth embodiment is of a rectangular frustum having vertical faces 109, in which each of all the side surfaces is formed of an inclined, flat surface 108, ascending from the bottom surface toward the top surface. The height of the vertical faces 109 is preferably not more than 0.5 times the height of the terminal box 105. According to the present embodiment, a large draft angle can be ensured sufficiently throughout the circumference of the terminal box 105, so that the moldability is enhanced remarkably.

Figure 11:
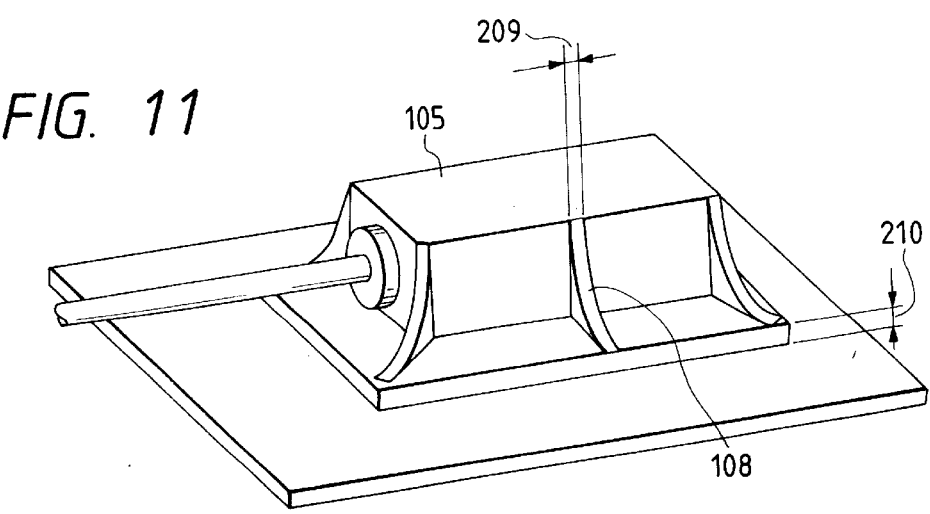
FIG. 11 is a schematic view of a terminal box of a fifth embodiment.
Figure 12:
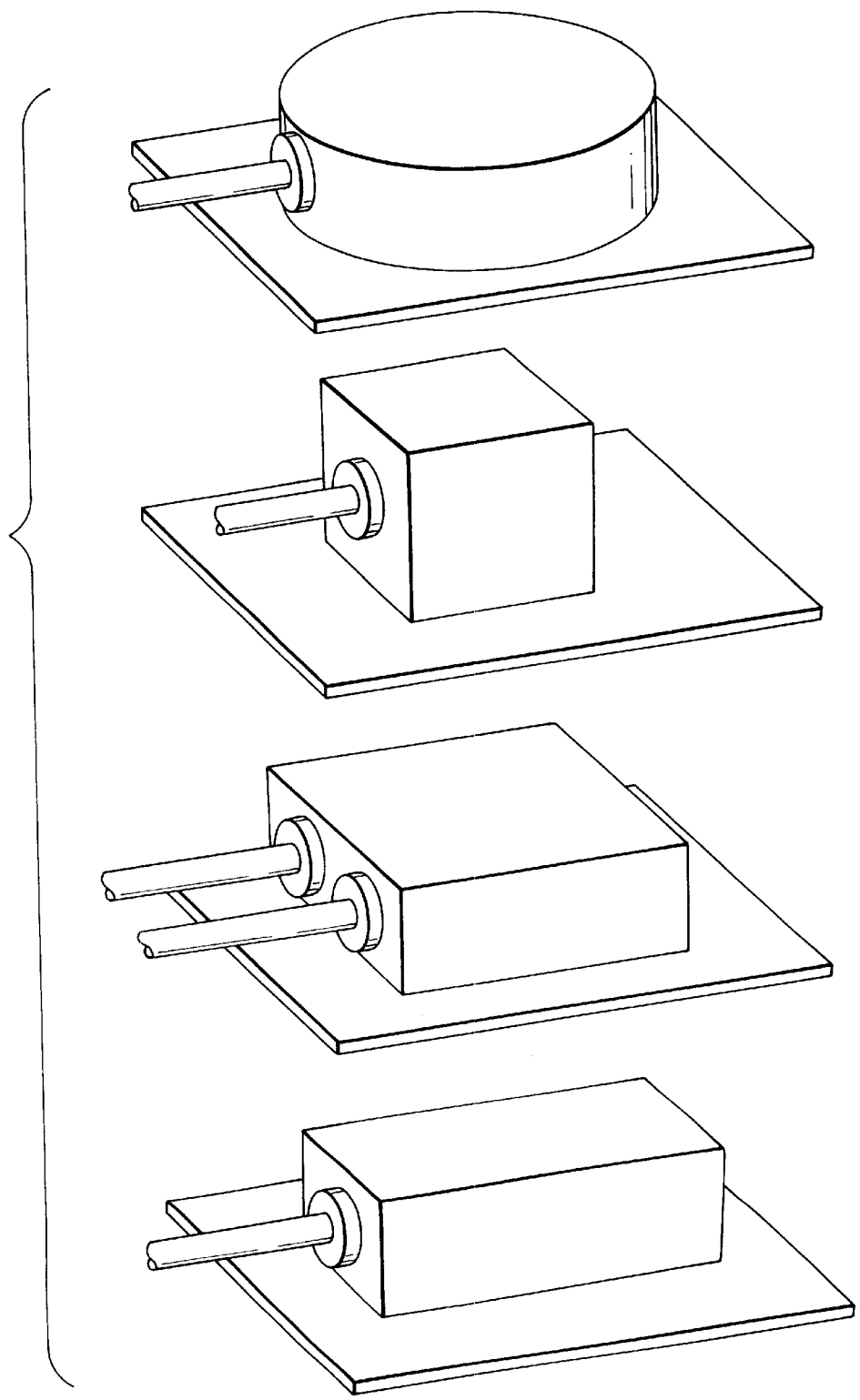
FIG. 12 is schematic view of conventional terminal boxes.
Figure 13:
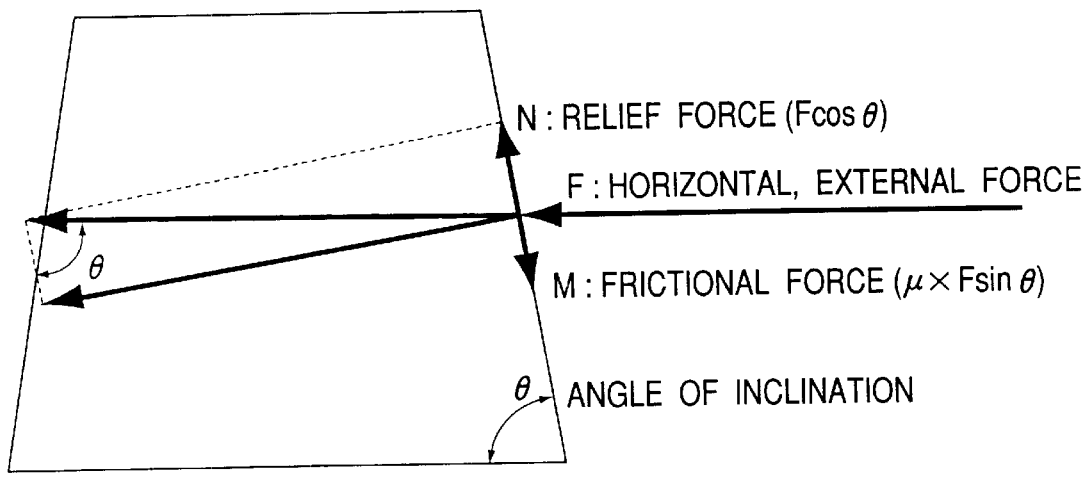
FIG. 13 is a view showing the relation between a terminal box and an external force exerted thereon.

FIG. 11 is a view showing a fifth embodiment of the present invention, wherein each of all the side surfaces of the terminal box 105 is provided partly with inclined surfaces 108 of the rib shape, each being a curved surface ascending from the bottom surface toward the top surface. As the shape of the rib, defining the thickness 209 of the rib to be 0.5 to 0.7 times the thickness 210 of the bottom surface prevents sink marks or the like from occurring and improves moldability, which is thus preferable. According to the present embodiment, since the inclined surfaces 108 are of the rib shape, their reinforcing effect increases the rigidity and load bearing properties and their warpage preventing effect improves the moldability.

Described below is a method for manufacturing an example of a solar cell module wherein amorphous silicon solar cell elements formed on a stainless steel substrate are connected in series and are encapsulated with a weather-resistant resin with a galvanized sheet iron being provided on the back surface thereof.

Figure 2:
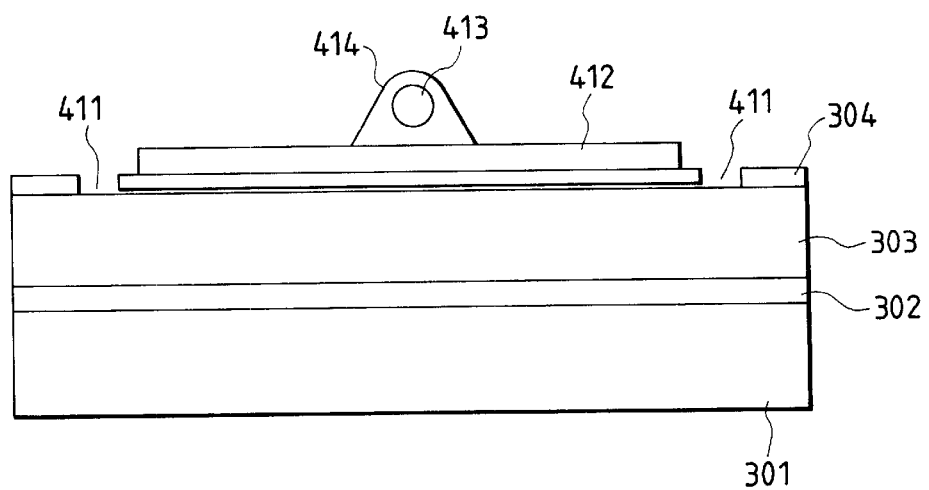
FIG. 2 is a schematic view of a solar cell element.

Procedures for producing the amorphous silicon solar cell element will be described first referring to FIG. 2 and FIG. 3.

On a cleaned, elongate stainless steel substrate (conductive substrate 301) of 0.1 mm in thickness unwound from a roll, was deposited Al containing 1% of Si (back surface reflective layer 302) in the film thickness of 5000 Å by sputtering.

Then, an n/i/p-type amorphous silicon semiconductor (semiconductor layer 303) was formed by a plasma CVD process by successively depositing the n-type semiconductor layer in the thickness of 300 Å, the i-type semiconductor layer in the thickness of 4000 Å, and the p-type semiconductor layer in the thickness of 100 Å, using gases of $PH_3$, $SiH_4$, and $H_2$ for the n-type semiconductor, gases of $SiH_4$ and $H_2$ for the i-type semiconductor, and gases of $B_2H_6$, $SiH_4$, and $H_2$ for the p-type semiconductor.

After that, ITO (transparent, conductive layer 304) of a film thickness of 800 Å was formed by resistance heating evaporation to form an amorphous silicon solar cell element.

Figure 3:
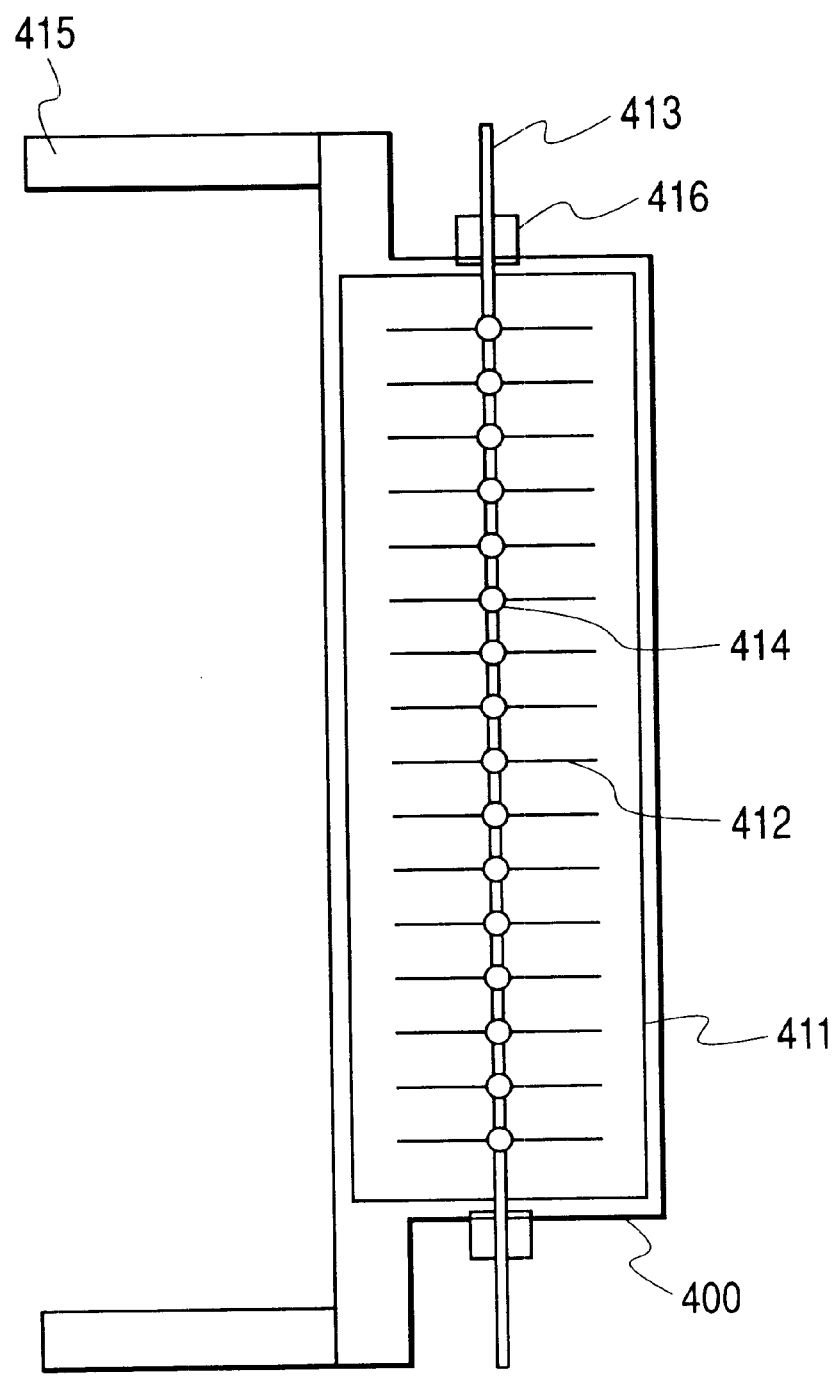
FIG. 3 is a schematic view of a solar cell strip.

Next, the elongate solar cell element produced as described above was processed so as to punch out the shape as shown in FIG. 3, by use of a press machine, thereby producing a plurality of solar cell strips 400.

On a cut face of the solar cell strip 400 cut out by the press machine, the solar cell strip 400 was crashed such that the transparent, conductive layer 304 and the conductive substrate 301 were brought into short-circuit. For repairing this short-circuit, an element isolating portion 411 was provided in the periphery of the transparent, conductive layer 304, and the periphery of the transparent, conductive layer 304 was removed by this element isolating portion 411. This removal was conducted specifically as follows.

First, an etchant ($FeCl_3$ solution) having such selectivity as to dissolve the transparent, conductive layer 304 but as not to dissolve the semiconductor layer 303 was screen-printed on the periphery of the transparent, conductive layer 304 slightly inside the cut face of the solar cell strip 400 to dissolve the transparent, conductive layer 304 and then cleaning with water was carried out, thereby forming the element isolating portion 411 of the transparent, conductive layer 304.

Then a silver paste a binder of which was a polyester resin ("5007" available from DuPont Inc.) was screen-printed to form grid electrodes 412 for collection of current on the transparent, conductive layer 304. Then a tinned copper wire 413 as a collector electrode for the grid electrodes 412 was disposed so as to be perpendicular to the grid electrodes 412. After that, onto each of intersecting points between the wire 413 and the grid electrodes 412, adhesive silver ink 414 ("C-220" available from Emerson & Cumming Inc.) was dropped and was dried at 150° C. for 30 minutes, thereby connecting the grid electrodes 412 with the tinned copper wire 413. On that occasion, in order to avoid contact of the tinned copper wire 413 with the end faces of the conductive substrate 301 polyimide tape 416 was stuck to the bottom of the tinned copper wire 413.

Then, a part of the transparent, conductive layer 304/semiconductor layer 303 in the non-power-generating region of the solar cell strip 400 was removed by a grinder to expose the conductive substrate 301 and thereafter copper foils 415 were welded to the exposed portions by a spot welder.

Figure 4:
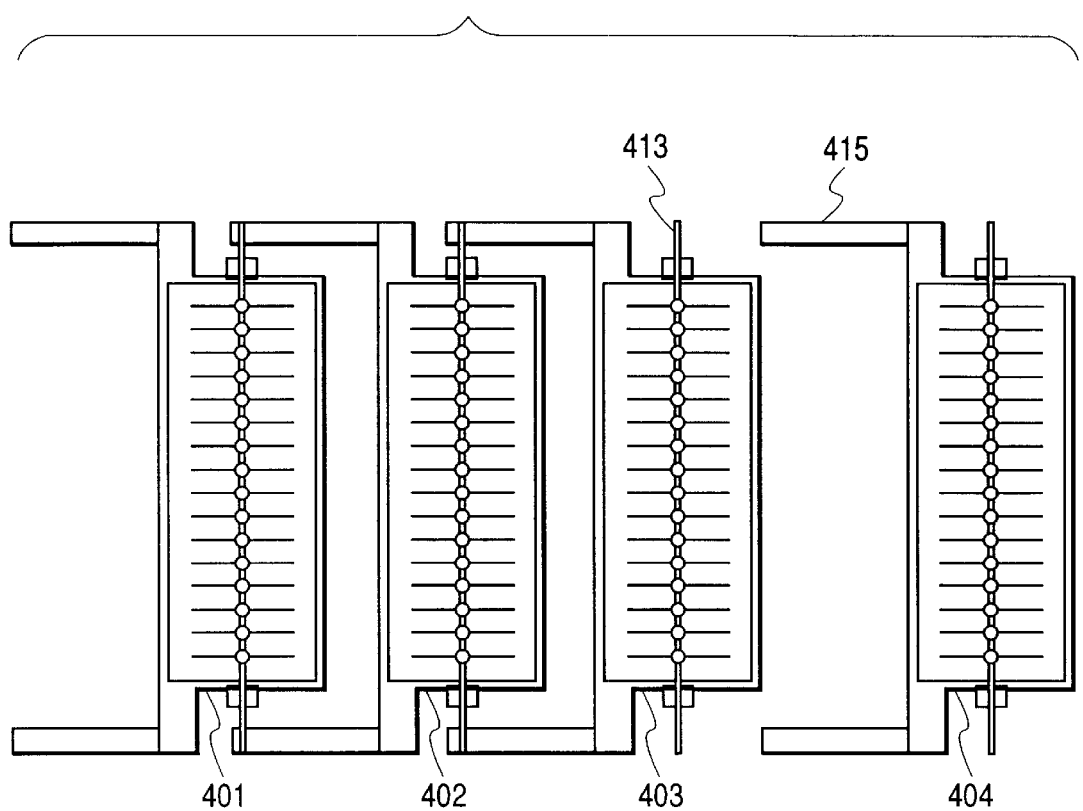
FIG. 4 is a schematic view showing a state of solar cell strips connected in series.

Then, as shown in FIG. 4, the tinned copper wire 413 of one solar cell strip 401 was soldered to the copper foil 415 of another solar cell strip 402, thereby connecting the strips in series. Further, by soldering the tinned copper wire 413 and the copper foil 415 of adjacent solar cell strips in the same manner, four solar cell strips 401, 402, 403, and 404 were connected in series. Wiring to the positive and negative output terminals was performed on the back side of the conductive substrate 301 of each solar cell strip.

Figure 6:
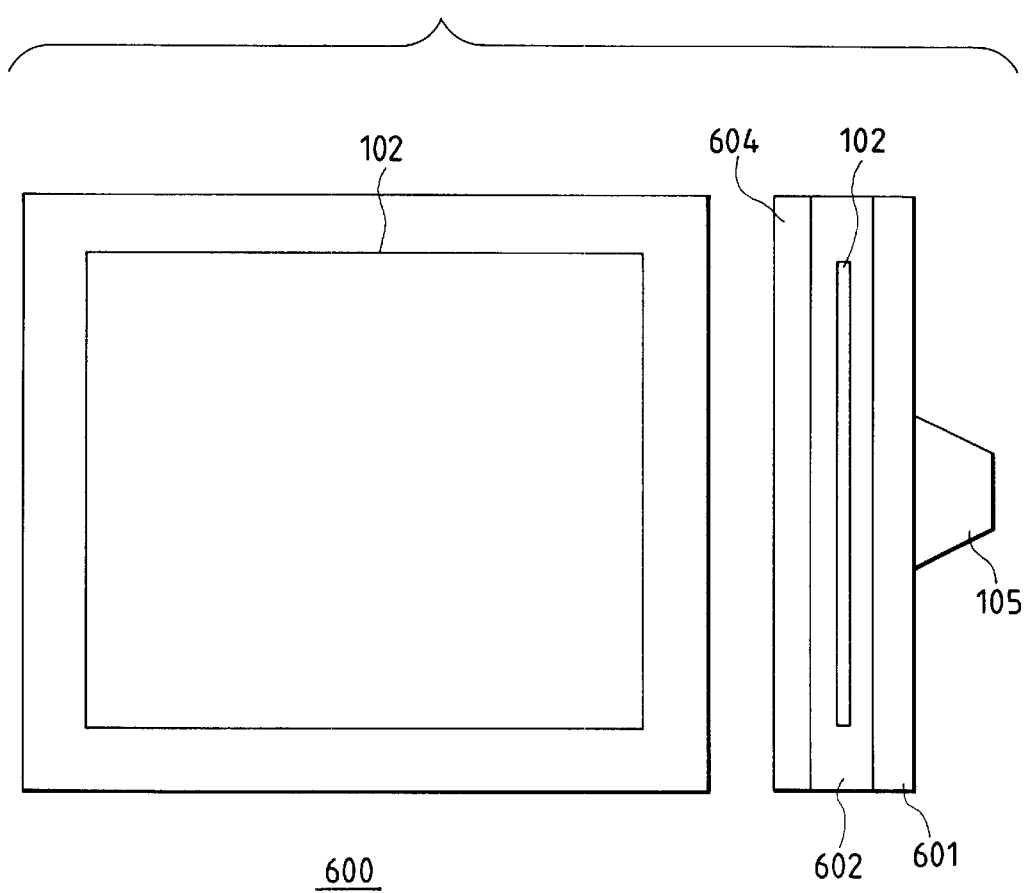
FIG. 6 is a schematic view of a solar cell module.

Then, as shown in FIG. 6, a filler 602 of a sheet form of EVA, the solar cell element 102 of the solar cell strips connected in series, the filler 602, and fluororesin film (weather-resistant film 604) were stacked in order on a galvanized sheet iron (back surface reinforcing material 601) and the fillers 602 were melted at 150° C. with degassing under pressure so as to sandwich the solar cell element 102 between the weather-resistant film 604 and the back surface reinforcing material 601, thus forming a solar cell module 600.

Here, in the back surface reinforcing material 601, there were preliminarily made two holes in order to expose the output terminals. Further, the bonding surface of the weather-resistant film 604 was preliminarily processed by the plasma treatment in order to enhance adhesion to the filler 602, and the tensile elongation thereof was not less than 250%. Since the edge portions of the solar cell module 600 were bent in a subsequent step, the solar cell element 102 was made in a slightly smaller size than the back surface reinforcing material 601 and than the weather-resistant film 604.

Figure 5:
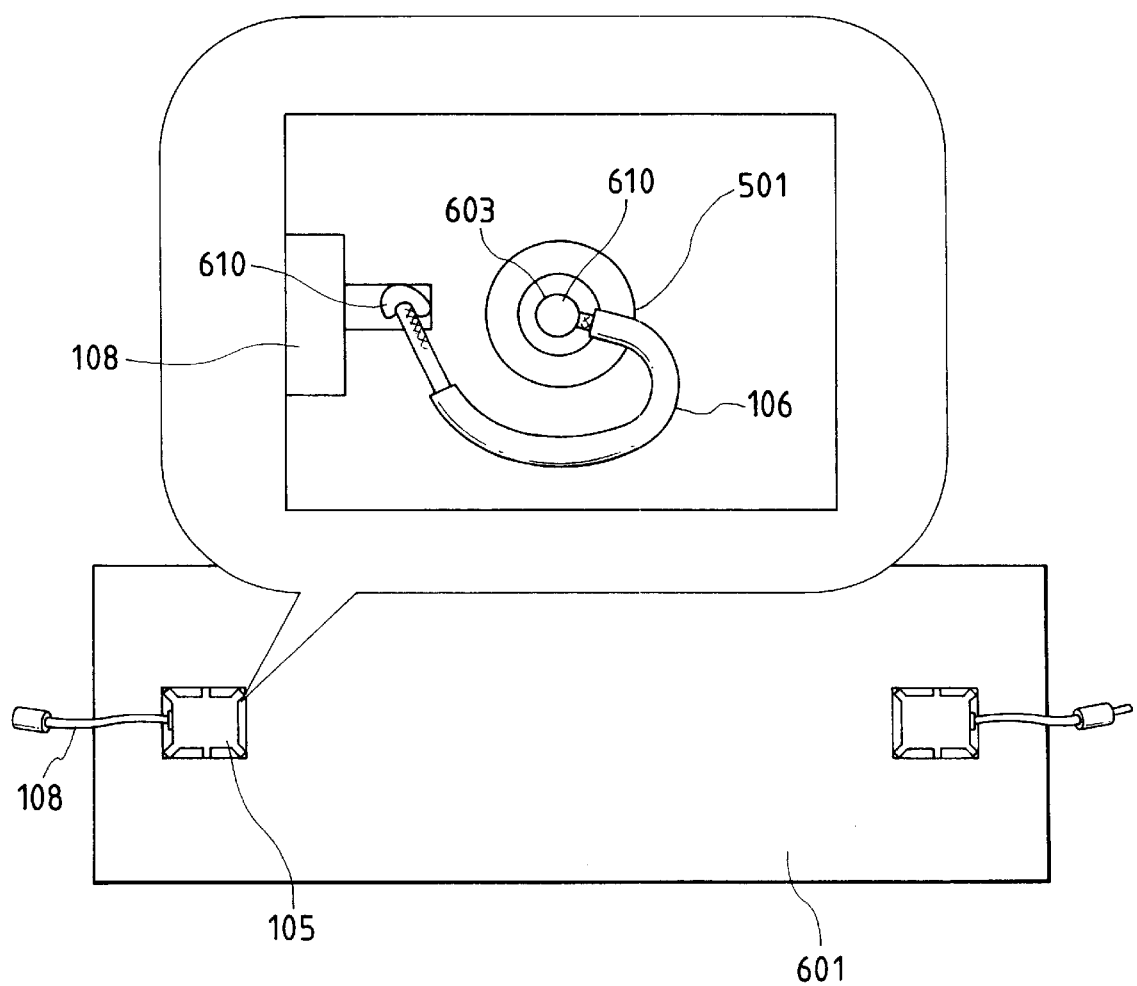
FIG. 5 is a schematic view showing the back surface of a solar cell module.

Then, as shown in FIG. 5, through two terminal outlet holes 501 formed in the back surface reinforcing material 601 of the solar cell module, the positive and negative output terminals (portions to which internal lead wires are to be attached) 603 were exposed and then the output terminals 603 and external lead wires 108 were electrically connected via internal lead wires 106 by solder 610. Then the terminal boxes 105 were attached to the back surface reinforcing material with an adhesive so as to cover these terminal outlet holes 501.

As described above, according to the present invention, by providing an inclined surface partly or entirely in the portion that is relatively subject to suffer an external force, of each of all the side surfaces of a terminal box, an effect of relieving an external force in the horizontal direction during application of the external force in the horizontal direction is enhanced, whereby it becomes possible to provide a structure of the terminal exposing portion of a solar cell module with high rigidity, high load bearing properties, high reliability after installation, and high moldability.

What is claimed is:

1. A terminal box for mounting on an outer surface of a solar cell module to cover an electrode portion of the solar cell module, having an upper surface, a bottom surface to be attached to the solar cell module, and side surfaces, wherein each of said side surfaces has at least one inclined rib, wherein each said inclined rib extends from the upper surface to the bottom surface.

2. The terminal box according to claim 1, wherein the terminal box and an external material comprise predetermined materials, and wherein an angle of inclination θ (degrees) of the inclined rib satisfies the following equation:

$$\theta < \mathrm{Tan}^{-1}(1/\mu),$$

wherein $\mu$ is a coefficient of friction between the terminal box and the external material, and wherein the angle is formed between each said side and the bottom surface.

3. The terminal box according to claim 2, wherein at least the inclined rib is comprised of a resin having a coefficient of friction $\mu$ not more than 0.6.

4. The terminal box according to claim 2, wherein the angle of inclination of the inclined rib is not more that 60°.

5. The terminal box according to claim 2, wherein the external material is the same as a material constituting a terminal box.

6. The terminal box according to claim 1, wherein the inclined rib is curved.

7. The terminal box according to claim 1, wherein the inclined rib is flat.

8. The terminal box according to claim 1, wherein the thickness of the inclined rib is 0.5 to 0.7 times the thickness of a bottom surface of the terminal box.

9. The terminal box according to claim 1, wherein a conductor taken from a bottom surface of the terminal box thereinto is electrically connected with a conductor taken from a surface different from the bottom surface thereinto inside the terminal box.

10. The terminal box according to claim 9, wherein the conductor taken from the bottom surface and the conductor taken from the surface different from the bottom surface are mechanically fixed to an inside portion of the terminal box.

11. The terminal box according to claim 1, wherein said terminal box is attached to a part of the solar cell module.

12. The terminal box according to claim 1, wherein said terminal box is rectangular, and the inclined rib is provided at each of four sides of the terminal box.

13. The terminal box according to claim 1, wherein each side is provided with an inclined rib and a shape of the terminal box formed by surfaces connecting the inclined rib is a rectangular frustum.

14. The terminal box according to claim 1, wherein the bottom face extends outwardly from said sides, and wherein said inclined rib extends from said upper surface to the outward extension of the bottom surface.

15. A solar cell module comprising:

a terminal box for mounting on an outer surface of a solar cell module to cover an electrode portion of the solar cell module, having an upper surface, a bottom surface to be attached to the solar cell module, and side surfaces, wherein each of said side surfaces has at least one inclined rib, wherein each said inclined rib extends from the upper surface to the bottom surface.

16. A solar cell module according to claim 15, wherein the bottom face extends outwardly from said sides, and wherein said inclined rib extends from said upper surface to the outward extension of the bottom surface.

* * * * *